United States Patent [19]

Hayashi et al.

[11] Patent Number: 5,610,774

[45] Date of Patent: Mar. 11, 1997

[54] AUDIO SOUND RECORDING/REPRODUCING APPARATUS USING SEMICONDUCTOR MEMORY

[75] Inventors: Kousou Hayashi; Tadashi Koike, both of Hiroshima-ken, Japan

[73] Assignee: Sharp Kabushiki Kaisha, Osaka, Japan

[21] Appl. No.: 205,769

[22] Filed: Mar. 4, 1994

Related U.S. Application Data

[63] Continuation of Ser. No. 958,899, Oct. 9, 1992, abandoned.

[30] Foreign Application Priority Data

Oct. 11, 1991 [JP] Japan .................................. 3-263654

[51] Int. Cl.⁶ ...................................... G11B 5/86
[52] U.S. Cl. ................ 360/15; 369/70; 395/2.79
[58] Field of Search ........................... 360/2, 72.1, 35.1, 360/9.1, 15, 8, 71; 358/341; 381/41, 51; 365/230.01, 195; 371/10.2; 434/317; 395/2.87, 2.79, 2.44, 2.69; 369/70

[56] References Cited

U.S. PATENT DOCUMENTS

| | | | |
|---|---|---|---|
| 3,803,358 | 4/1974 | Schirf et al. | 395/2.76 |
| 4,490,747 | 12/1984 | Yokoyama | 360/72.1 X |
| 4,677,501 | 6/1987 | Saltzmann et al. | 360/72.1 X |
| 4,782,510 | 11/1988 | Szlam | 379/88 |
| 4,884,974 | 12/1989 | DeSmet | 434/317 |
| 4,924,332 | 5/1990 | Dwyer et al. | 360/72.2 |
| 4,970,612 | 11/1990 | Renders et al. | 360/71 X |
| 5,056,145 | 10/1991 | Yamamoto et al. | 387/51 |
| 5,164,839 | 11/1992 | Lang | 360/9.1 X |
| 5,170,388 | 12/1992 | Endoh | 358/341 X |
| 5,200,863 | 4/1993 | Orii | 360/35.1 |
| 5,226,015 | 7/1993 | Gotou et al. | 365/230.01 |
| 5,297,148 | 3/1994 | Harai et al. | 371/10.2 |
| 5,361,341 | 11/1994 | Sourgen et al. | 365/195 X |

FOREIGN PATENT DOCUMENTS

| | | |
|---|---|---|
| 0065148 | 11/1982 | European Pat. Off. . |
| 0294201A2 | 12/1988 | European Pat. Off. . |
| 0406744 | 1/1991 | European Pat. Off. . |
| 01008949 | 1/1989 | Japan . |
| 01091292 | 4/1989 | Japan . |
| 01270192 | 10/1989 | Japan . |
| 2170037 | 7/1986 | United Kingdom . |
| WO91/08572 | 6/1991 | WIPO . |

OTHER PUBLICATIONS

Dictionary of Computers, Information Processing, and Telecommunications, 2nd Ed., Jerry Rosenberg, Ph.D., John Wiley & Sons, New York, 1987.

*Primary Examiner*—Andrew L. Sniezek
*Attorney, Agent, or Firm*—Nixon & Vanderhye P.C.

[57] ABSTRACT

In an audio sound recording/reproducing apparatus, instruction information related to a document is recorded in a recording region of a semiconductor memory together with the document. In the semiconductor memory, flags related to a document portion and an instruction portion, and the addresses of the document and the instruction portions are provided. At the time of reproduction, the instruction portion is reproduced prior to reproduction of the document portion. When the content of the semiconductor memory is stored in a built-in memory in the apparatus, the instruction portion is stored before the document portion is stored. Since the instruction portion is reproduced prior to the document portion at the time of reproduction, the user does not have to retrieve the instruction portion.

11 Claims, 11 Drawing Sheets

AUDIO SOUND RECORDING/REPRODUCING APPARATUS USING SEMICONDUCTOR MEMORY

This is a continuation of application Ser. No. 07/958,899, filed Oct. 9, 1992, now abandoned.

BACKGROUND OF THE INVENTION

1. Field of the Invention

The invention relates generally to audio sound recording/reproducing apparatuses, and more specifically to an audio sound recording/reproducing apparatus for converting an analog signal obtained from a microphone or the like into a digital signal for recording in a semiconductor memory, converting a digital signal recorded in the semiconductor memory into an analog signal at the time of reproduction, and outputting the converted signal as an audio sound through a speaker or the like.

2. Description of the Related Art

Among audio sound recording/reproducing apparatuses, cassette tape recorders are generally known which utilize magnetic tapes such as cassette tapes. A cassette tape recorder has advantages that a magnetic tape which is a recording medium is not expensive, recording/reproducing for a long period of time is possible, etc. It is difficult however to reduce the size and volume of such a cassette tape recorder, because the apparatus needs a running mechanism for running a magnetic tape, the noise and trouble frequency of such a running mechanism are large, and a long period of time is necessary for accessing (fast forwarding, rewinding) at the time of program search (the head portion of a program is searched and brought to the position for reproduction).

Figure 10:
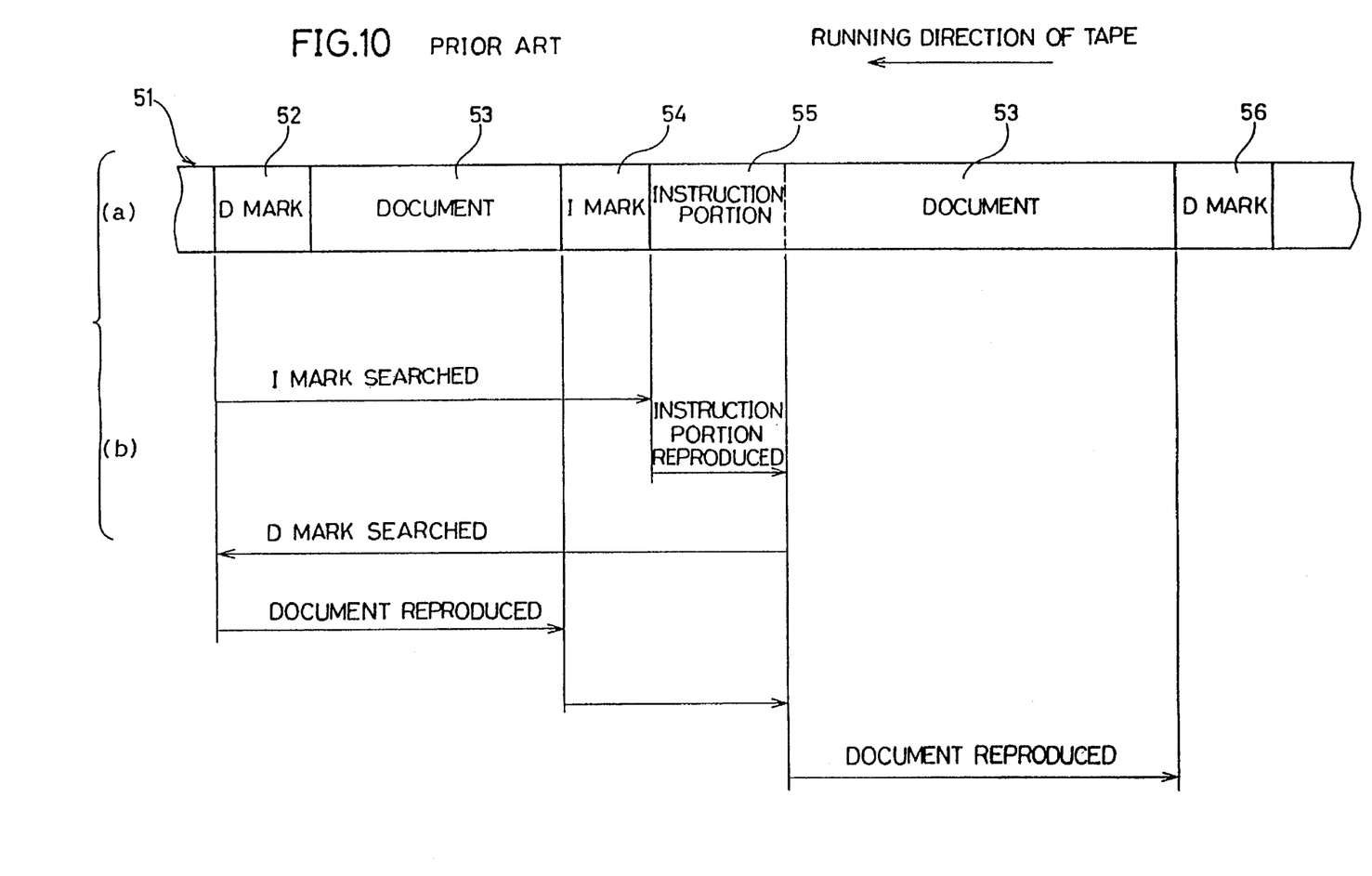
FIG. 10 is a representation showing a construction of a magnetic tape in an audio sound recording/reproducing apparatus utilizing a conventional magnetic tape and an operation at the time of reproduction.

The machine for noting oral statements (such as a dictating machine) can record voice sound for a plurality of segments, and if necessary, can record information corresponding to a certain segment together with a mark for retrieval so as to aid a person to reproduce and note the information. For instance, when recording a certain document using the machine, if one desires his/her secretary to type the document later, he/she records a mark for retrieval (I mark 54) as shown in FIG. 10 (a). Subsequently he/she dictates "type this document" (the recorded portion will be referred to as an instruction portion 55). Then, the continuation of document 53 is recorded, and finally a document mark (D mark) 56 for retrieval is recorded.

Such recording permits his/her secretary to retrieve the I mark 54 recorded on a magnetic tape 51 and listen to the instruction of the dictator subsequently recorded. Based on the instruction, the secretary retrieves the document mark 52 and types out the document 53 reproducing it from the beginning. At that time, the instruction portion 55 is skipped.

Figure 11:
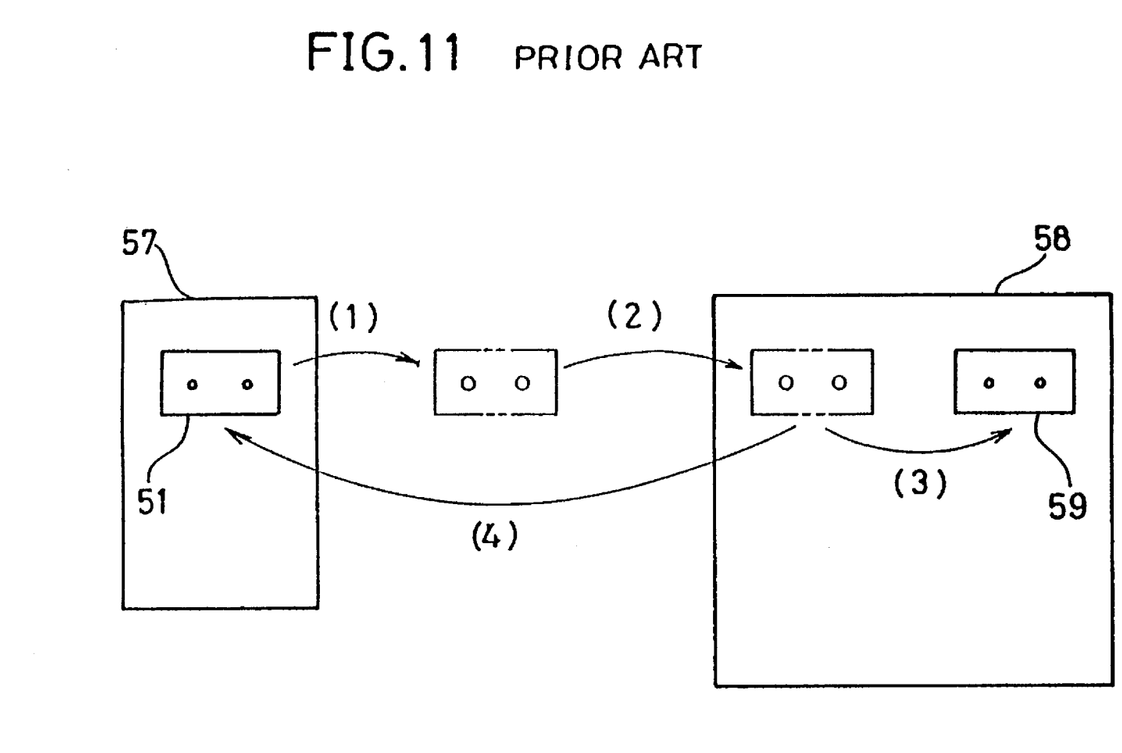
FIG. 11 is a representation showing a procedure when the content of a magnetic tape is duplicated in another magnetic tape in a conventional audio sound recording/reproducing apparatus.

If the dictator wants to duplicate the content of the magnetic tape 51 on another magnetic tape and hand it to the secretary, for example, in the case of using the dictating machine formed of a master machine 58 and a slave machine 57, as shown in FIG. 11, a process will be necessary which includes in order (1) taking out the recorded magnetic tape 51 from the slave machine 57, (2) setting it in the master machine 58, (3) duplicating the content of magnetic tape 51 on a magnetic tape 59, and (4) returning the magnetic tape 51 to the slave machine 57.

As described above, in the case of the dictating machine, it takes time for retrieval and the duplicating process is cumbersome.

Accordingly, in recent years, audio sound recording/reproducing apparatuses having a semiconductor memory in place of a magnetic tape have been developed in order to solve the above-stated problem. More specifically, in an audio sound recording/reproducing apparatus utilizing a semiconductor memory, since the accessing speed is reduced to the order of μs, search of a program, for example, is instantaneously completed. Since a running mechanism is not required, it will be easier to reduce the size and volume of the apparatus. The apparatus will also be free from noise created by the running mechanism.

Although time for operation is reduced in a conventional audio sound recording/reproducing apparatus utilizing a semiconductor memory as described above, operation for retrieval of documents and instruction information from the audio sound recording area is still necessary.

SUMMARY OF THE INVENTION

It is therefore an object of the invention to retrieve/reproduce documents and instruction information instantaneously and in a simple manner in an audio sound recording/reproducing apparatus utilizing a semiconductor memory.

Another object of the invention is to eliminate the necessity for a user to retrieve instruction information prior to reproduction of a document when he/she reproduces a tape, in an audio recording/reproducing apparatus utilizing a semiconductor memory.

A further object of the invention is to eliminate the necessity for a user to retrieve instruction information in an audio sound recording/reproducing apparatus of master-slave type utilizing a semiconductor memory, in which the content of the semiconductor memory of a slave machine is stored in the memory of a master machine.

The above-stated objects of the invention are achieved by an audio sound recording/reproducing apparatus utilizing a semiconductor memory including the following elements. More specifically, in an audio sound recording/reproducing apparatus in accordance with the invention, a semiconductor memory includes a first recording region comprising a plurality of addressable locations for recording a document and instruction information related to a document, and a second recording region comprising another plurality of addressable locations for recording the position of the document recorded in the first recording region and identification data for the information. The audio sound recording/reproducing apparatus includes a reference device for referring to the data of the second recording region.

In the audio sound recording/reproducing apparatus, since the identification information of documents and instruction information is recorded in the second recording region, and an audio sound recording device refers to the data of the second recording region, at the time of retrieval/reproduction of the documents it is not necessary to retrieve/reproduce the audio sound data of the first recording region in which the documents and instructions related to the documents are recorded.

Consequently, it will be possible to retrieve/reproduce documents and instruction information instantaneously and in a simple manner in an audio sound recording/reproducing apparatus utilizing a semiconductor memory.

In another aspect of the invention, the audio sound recording apparatus includes a master machine and a slave machine, and a memory card is detachably attached to the master machine and the slave machine. The memory card includes a first recording region for recording a document and information including an instruction on how the document is to be treated, and a second recording region for recording a recording position in the first recording region and identification data for the information. The master machine includes storage means for storing the content of the memory card, and a controller for controlling the memory to record the instruction information recorded in the first recording region at the time of recording and then to store information on the document.

When the content of the memory card is stored in the memory of the master machine, document information is stored after the instruction information is stored. If the information stored in the memory is reproduced, reproduction of the instruction information is conducted prior to reproduction of the document, and therefore the user does not have to retrieve the instruction information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the invention will be described in conjunction with FIGS. 1 to 8.

Figure 2:
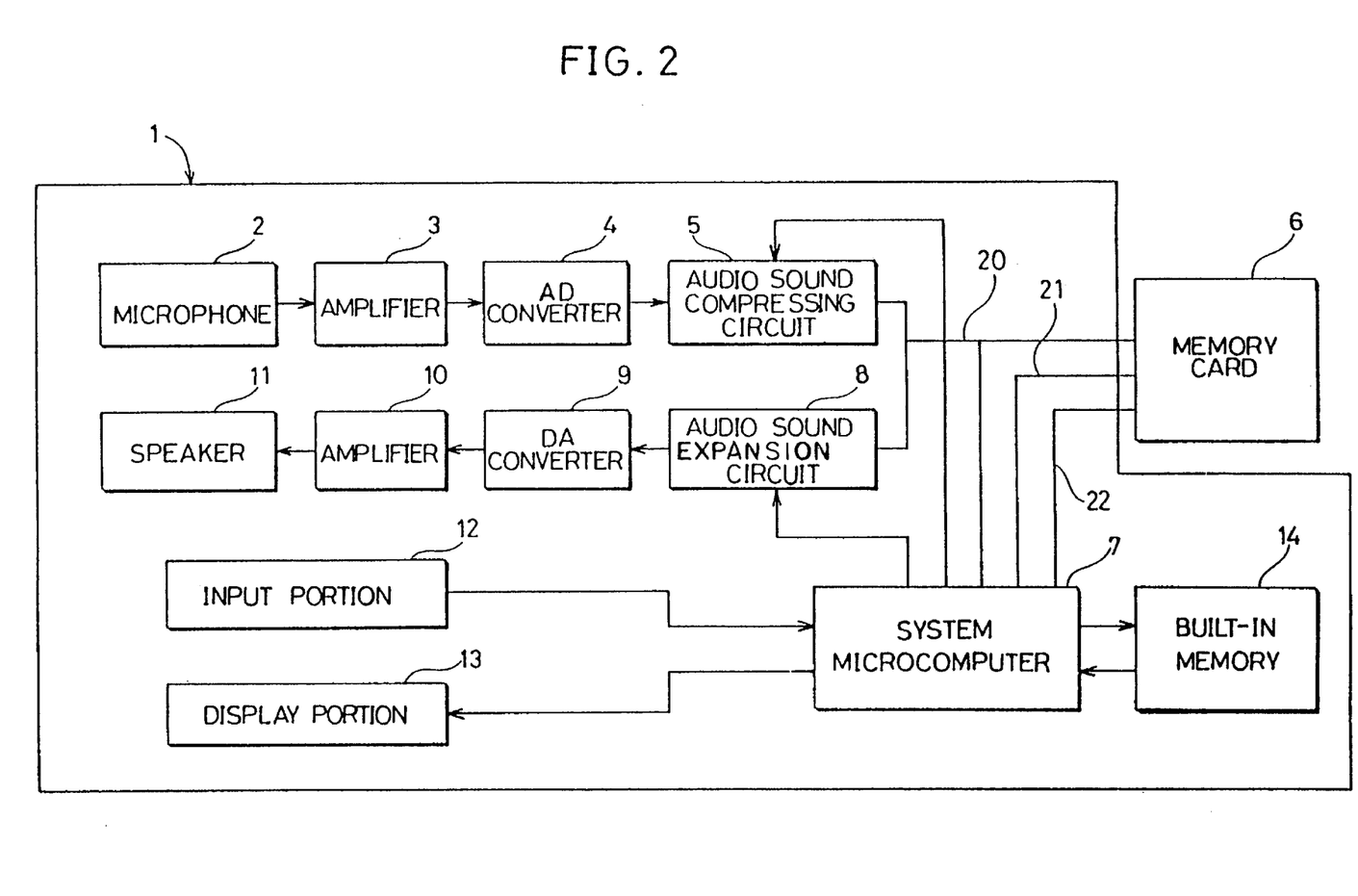
FIG. 2 is a block diagram showing a construction of an audio sound recording/reproducing apparatus in accordance with the invention.

An audio sound recording/reproducing apparatus in accordance with the invention includes a master machine and a slave machine. The master machine, for example, as shown in FIG. 2, includes a recording/reproducing device body 1 and a memory card 6 detachable to the recording/reproducing device body 1.

The recording/reproducing device body 1 includes a system microcomputer 7 for controlling the audio sound recording/reproducing apparatus. The system microcomputer 7 is connected to an audio signal recording system, an audio signal reproducing system, a built-in memory 14, an input unit 12, a display unit 13, and the memory card 6.

The audio signal recording system includes a microphone 2 for converting an audio sound into an analog audio sound signal which is an electrical signal, an amplifier 3 for amplifying the analog audio sound signal, an AD converter 4 for digitizing the analog audio sound signal to output as a digital audio sound signal, and an audio sound compression circuit 5 for compressing the digital audio sound signal to a level in the range from a fraction to one/several tenths.

The audio sound signal reproducing system includes an audio sound expansion circuit 8 for returning audio sound data input from the memory card 6 into the digital audio sound signal before the compression, a D/A converter 9 for converting the digital audio sound signal into an analog audio sound signal for output, an amplifier 10 for amplifying the analog audio sound signal, and a speaker 11 for outputting the analog audio sound signal as audio sound.

The built-in memory 14 connected to the system microcomputer 7 has a capacity for storing all the content of the memory card 6. The capacity of the built-in memory 14 in the slave machine is about in a level allowing accommodation of indexes or data for working which will be described later, and the other construction is substantially identical to the master machine.

The input unit 12 connected to the system microcomputer 7 includes a key portion formed of a reproduction key, a fast forwarding key, a rewinding key, an I mark key, and a D mark key. The display unit 13 is capable of displaying operation states such as reproduction and fast forwarding and elapsed time calculated from audio data by numerals and characters.

The above-stated audio sound compression circuit 5 and the audio sound expansion circuit 8 are connected to the system microcomputer 7 and the memory card 6. The audio sound compression circuit 5 inputs the audio data which is a compressed digital audio signal into the system microcomputer 7 through a data bus 20, and has the data output to the memory card 6 through the system microcomputer 7. More specifically, the system microcomputer 7 reads the compressed audio sound data and writes in the memory card 6 designating an address. The system microcomputer 7 takes in audio sound data from the audio sound compression circuit 5 one after another by incrementing the address, and repeats a writing operation into the memory card 6. At the time of reproduction, the system microcomputer 7 designates an address from the memory card 6 for reading out audio data and transmits the read out data to the audio sound expansion circuit 8.

Figure 3:
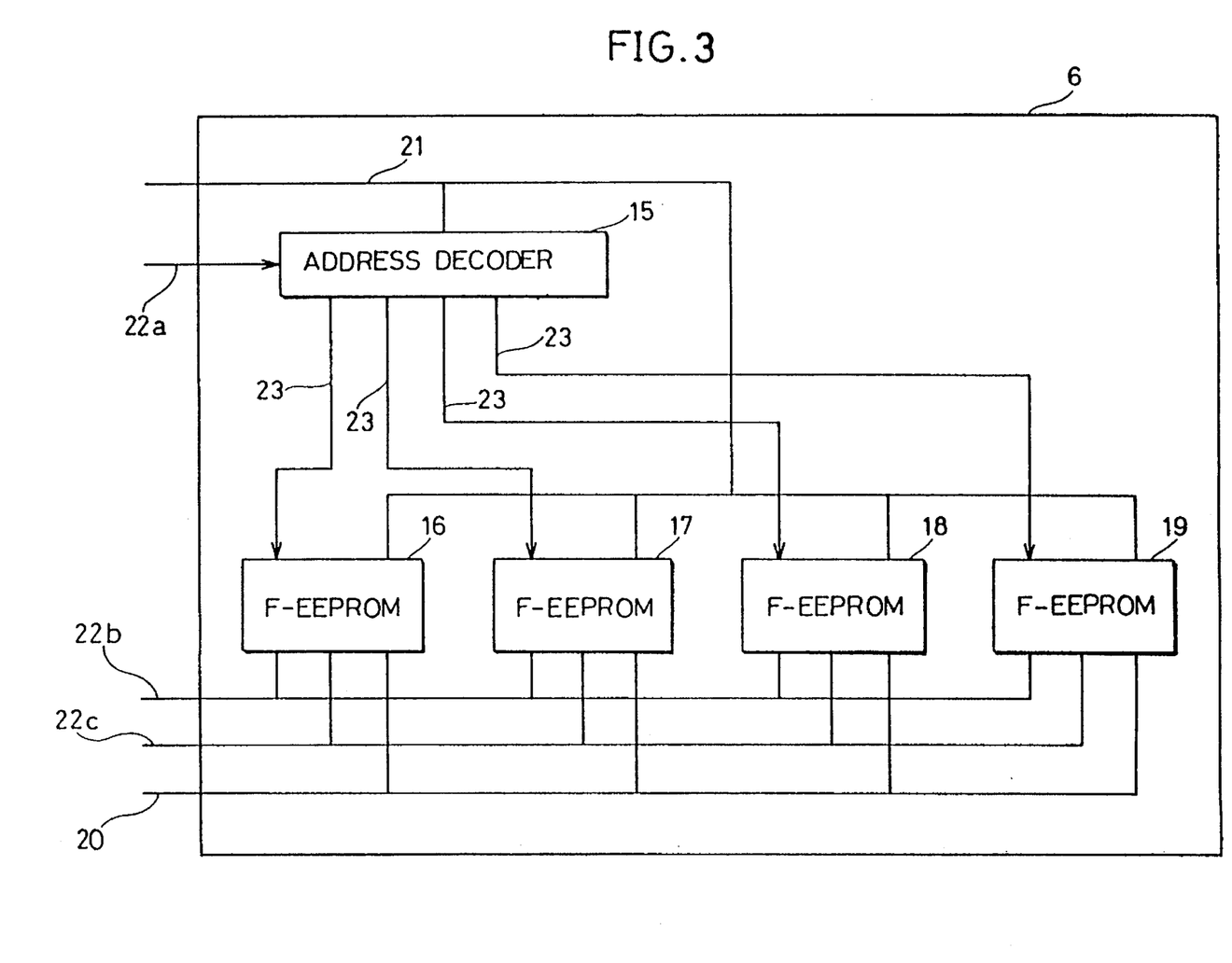
FIG. 3 is a block diagram showing the construction of the memory card shown in FIG. 2.

The memory card 6 detachable to the recording/reproducing device body 1 is connected to the audio sound compression circuit 5 and the audio sound expansion circuit 8 through the data bus 20, and also connected to the system microcomputer 7 through the data bus 20, an address bus 21 and a control bus 22. The memory card 6 as shown in FIG. 3 includes an address decoder 15 and a plurality of semiconductor memories, batch erase type programmable read only memories (flash type EEPROM, hereinafter referred to as F-EEPROMs) 16, 17, 18, and 19. The higher order addresses of the address bus 21 and the card enable (CE) signal line 22a are connected to the address decoder 15.

The above-stated address decoder 15 is connected to the F-EEPROMs 16, 17, 18 and 19 through chip select (CS) signal lines 23 and outputs a CS1 signal, a CS2 signal, a CS3 signal and a CS4 signal for selecting the F-EEPROMs 16, 17, 18 and 19, respectively. Furthermore, address bus 21, data bus 20, and an WE signal line 22b and an ERASE signal line 22c of control bus 22 are connected to the F-EEPROMs 16, 17, 18 and 19 other than the above-stated CS signal lines 23. A write enable (WE) signal for data writing is output by this WE signal line 22b, while an erase signal for batch erase of data is output by the ERASE signal line 22c.

The signals CS1–CS4 are produced by decoding higher order addresses on the address bus 21 by the address decoder 15. Since the signals CS1–CS4 are exclusive, writing and reading of data can be conducted to only the F-EEPROM on which a corresponding signal is true (electrically turned on). The CE (Card Enable) signal is for detaching all the F-EE-PROMs 16, 17, 18, and 19 in the memory card 6 from the data bus 20, and all the CS signals are decoded to be false when the CE signal is true in the address decoder 15.

In the memory card 6, in addition to the recording region for recording audio data such as documents and instruction information, an index region for recording sub information (hereinafter referred to index) for addresses and identification information for identifying the documents and the instruction information is provided.

Figure 1A:
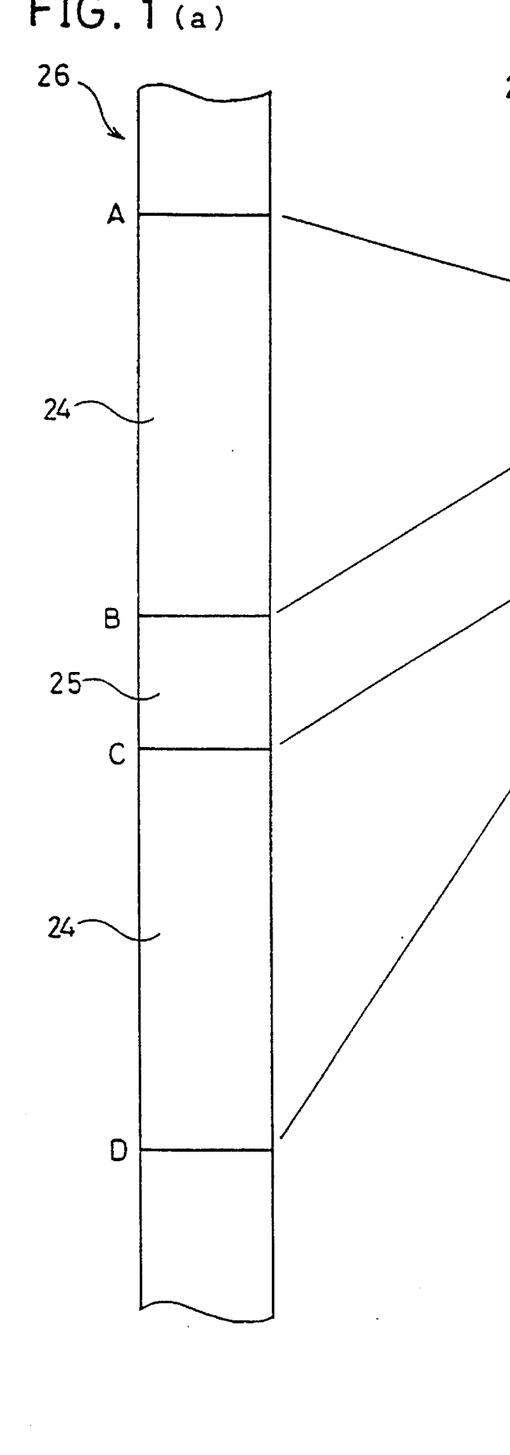
FIGS. 1a and 1b are representations showing a construction of a recording region and an index region in a memory card for use in an audio sound recording/reproducing apparatus in accordance with the invention.
Figure 1B:
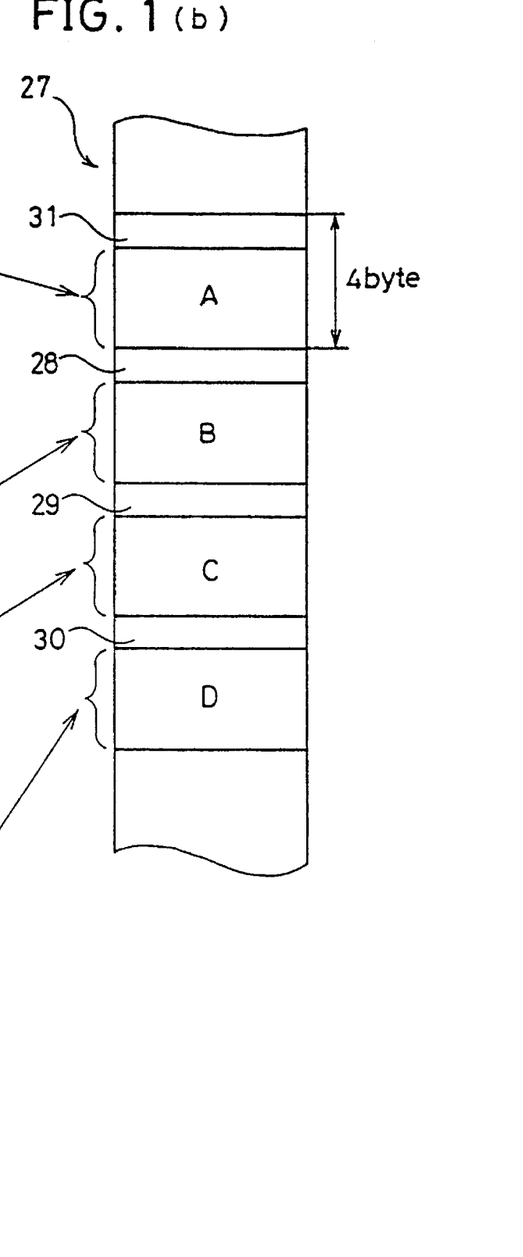

As shown in FIG. 1 (a), suppose that a document is recorded in a recording region 26 as a document portion 24. More specifically, the document portion 24 is recorded from the position indicated by address A, and instruction information is recorded from the position of the in-between address B as an instruction portion 25. The instruction portion 25 ends at the position of address C, and subsequently the document portion 24 is once again recorded to the position of address D. At that time, as shown in FIG. 1 (b), in an index region 27, the address A is recorded, and then the flag 28 of I mark which is identification information for showing the start of the instruction portion 25 followed by recording of the address B. The flag 29 of I mark showing the end of the instruction portion 25 and the address C are recorded, followed by the flag 30 of D mark which is instruction information showing the end of the document portion 24 and its address D. Each flag and address in the index region 27 occupies a region of 4 bytes.

Figure 4:
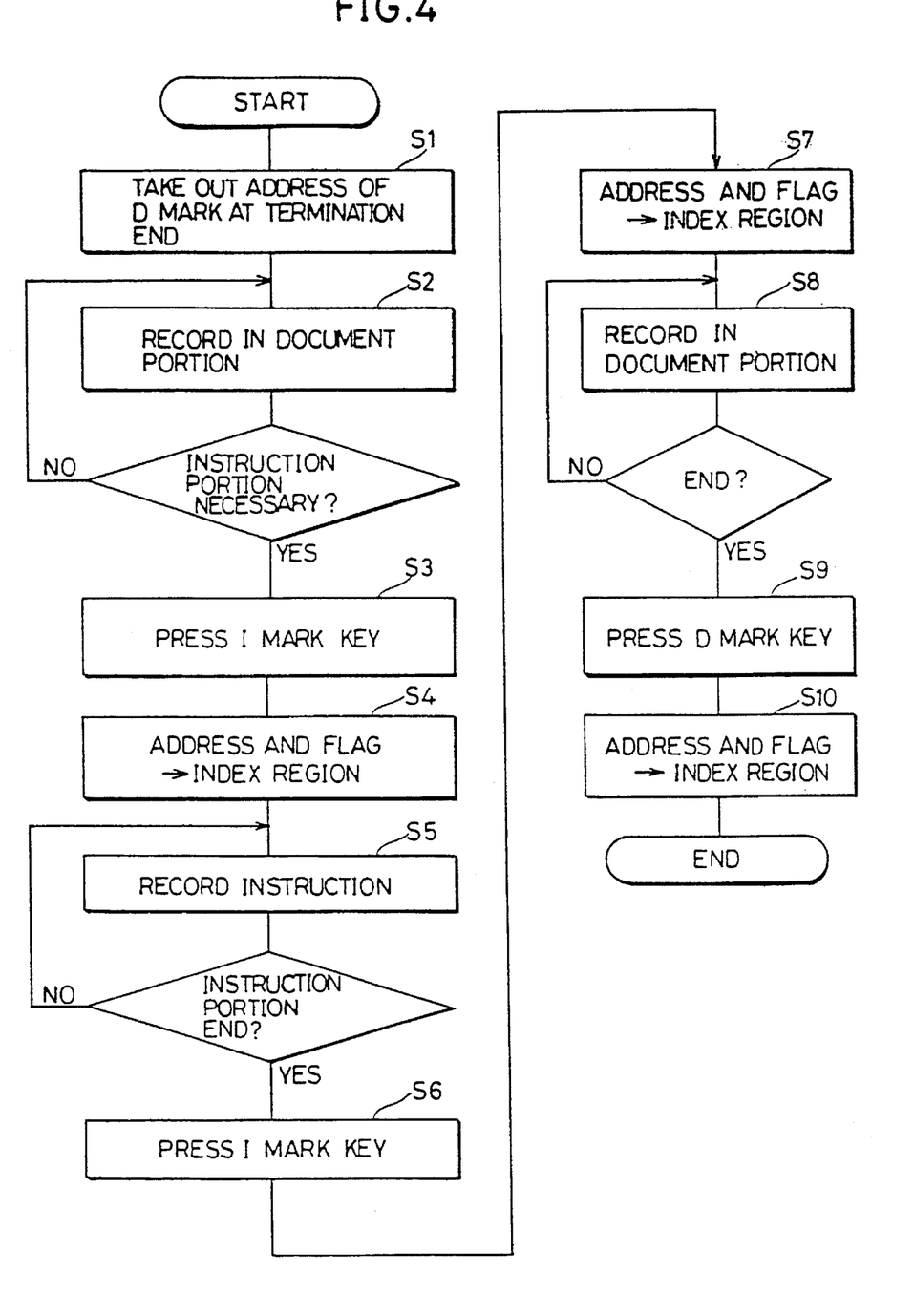
FIG. 4 is a flow chart showing an operation when a recording is conducted into a memory card by an audio sound recording/reproducing apparatus in accordance with the invention.
Figure 5:
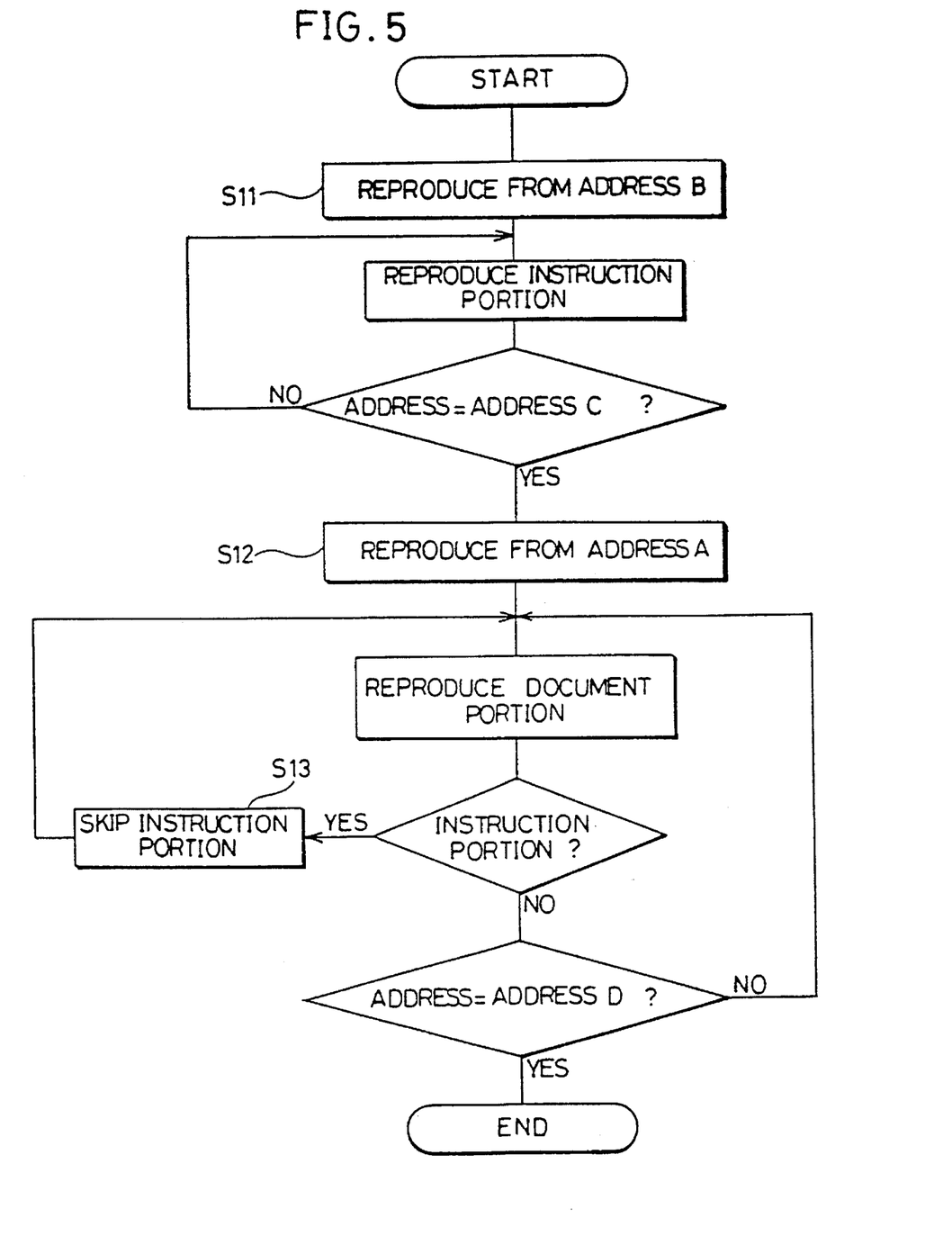
FIG. 5 is a flow chart showing an operation when a reproduction from a memory card is conducted by an audio sound recording/reproducing apparatus in accordance with the invention.

In the above-stated construction, a procedure when recording/reproduction is conducted to the memory card 6 utilizing an audio sound recording/reproducing apparatus in accordance with the invention will be described in conjunction with FIGS. 4 and 5 and also referring to FIGS. 1 and 2.

At the time of recording, a recording key which is not shown in the input unit 12 is pressed, and recording of an audio sound input from the microphone 2 into the memory card 6 is initiated by the system microcomputer 7. At that time, if the memory card 6 is partially recorded with information, recording is conducted from the D mark position which is at the end of the recorded document. More specifically, if the document is recorded to as far as the address A of the recording region 26, the flag 31 of the final D mark in the index region 27 and the address A are taken out, and recording of the document portion 24 is initiated from the position of the address A in the recording region 26 (S1). When the document is recorded through the microphone 2, recording of the document portion 24 is conducted (S2). When an I mark key (not shown) is pressed in the middle of recording (S3), the address B at that time is recorded as a priority segment into the index region 27 together with the flag 28 of I mark (S4). Then, after recording of an instruction in the instruction portion 25 (S5), when the I mark key is pressed once again (S6), the address C at that time is recorded into the index region 27 as an I mark end address together with the flag 29 of I mark (S7). Then, recording of the document is resumed (S8). When the recording is completed a D mark key (not shown) is pressed (S9), and the address D at that time is recorded into the index region 27 together with the flag 30 of D mark (S10).

As described above, when information recorded in the memory card 6 is reproduced, the address B at the starting end of I mark which is a priority segment, the address C at the termination end, the address A at the starting end of the document and the address D at the termination end are read out and stored in the built-in memory 14.

When reproduction is conducted a play key in the input unit 12 which is not shown is pressed and audio sound data is read out from the memory card 6 for reproduction from a speaker 11. A skip over and a skip back on a document by document basis can be made by pressing the FF and REW keys, respectively. The audio sound recording/reproducing apparatus utilizing a semiconductor memory in accordance with the present embodiment allows instantaneous skip over and skip back by referring to the data in the above-stated index region 27.

When reproduction is initiated, the reproduction is conducted from the priority segment. More specifically, as shown in FIG. 5, reproduction of the above read out address B, in other words reproduction of an audio sound from the instruction portion 25 is conducted (S11). When the reproduction of the instruction portion 25 is completed, the address A in other words the document portion 24 is reproduced from the beginning (S12), the instruction portion 25 which is the priority segment in the middle of the document portion 24 is skipped over (S13) and reproduction of the document as far as the address D representing the position of D mark is conducted.

In the present embodiment, the case has been described in which only the instruction portion 25 in the single document portion 24 is reproduced as the priority segment before reproduction of the document portion 24, but the invention is not limited thereto, and the apparatus may have a function of reproducing only the instruction portions in the entire memory card 6. In that case, the most important document among a plurality of documents in the memory card 6 can be reproduced first, judging from the contents of the plurality of instruction portions. More specifically, a special code is designated for flag 28 and 29 to show the priority of the instruction and the same is referred to at the time of reproduction.

It is also possible to duplicate information from the memory card and temporarily store the information in the built-in memory in the apparatus and reproduce the information data when such information is necessary. This is because a memory card is generally expensive, and therefore, if information stored in the memory card is duplicated, the memory card can be used for another purpose.

Figure 6:
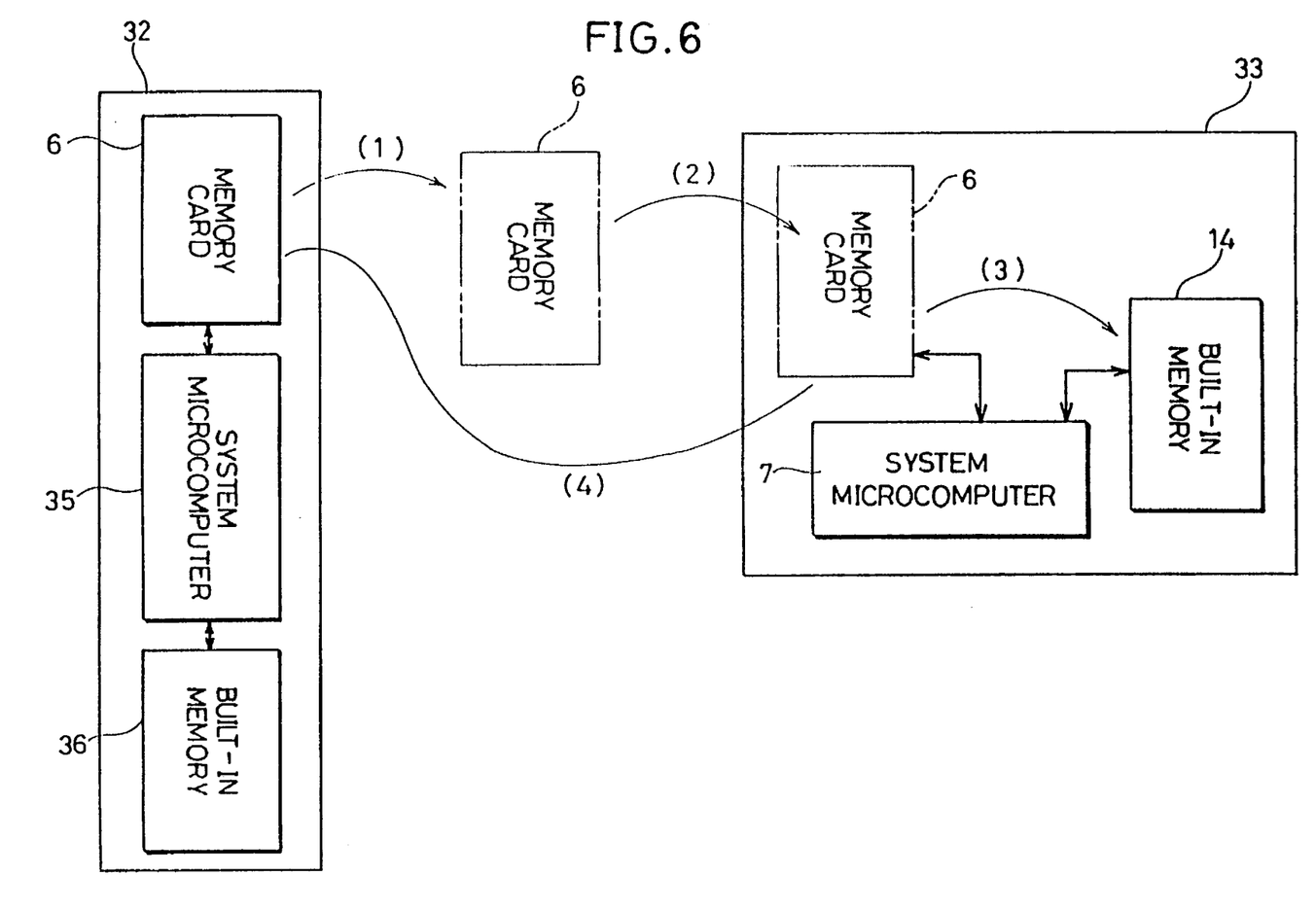
FIG. 6 is a representation showing a procedure when the content of a memory card is duplicated into a built-in memory in an audio sound recording/reproducing apparatus.

A procedure when the above-stated operation is conducted in a slave machine and a master machine in the audio sound recording/reproducing apparatus in accordance with the present embodiment will be described in conjunction with FIG. 6. (1) The memory card 6 recorded in the slave machine 32 is taken out. (2) The memory card 6 is set in the master machine 33. (3) The content of memory card 6 is duplicated and stored in the built-in memory 14 of the master machine 33. (4) The memory card 6 is returned to the slave machine 32.

Figure 7:
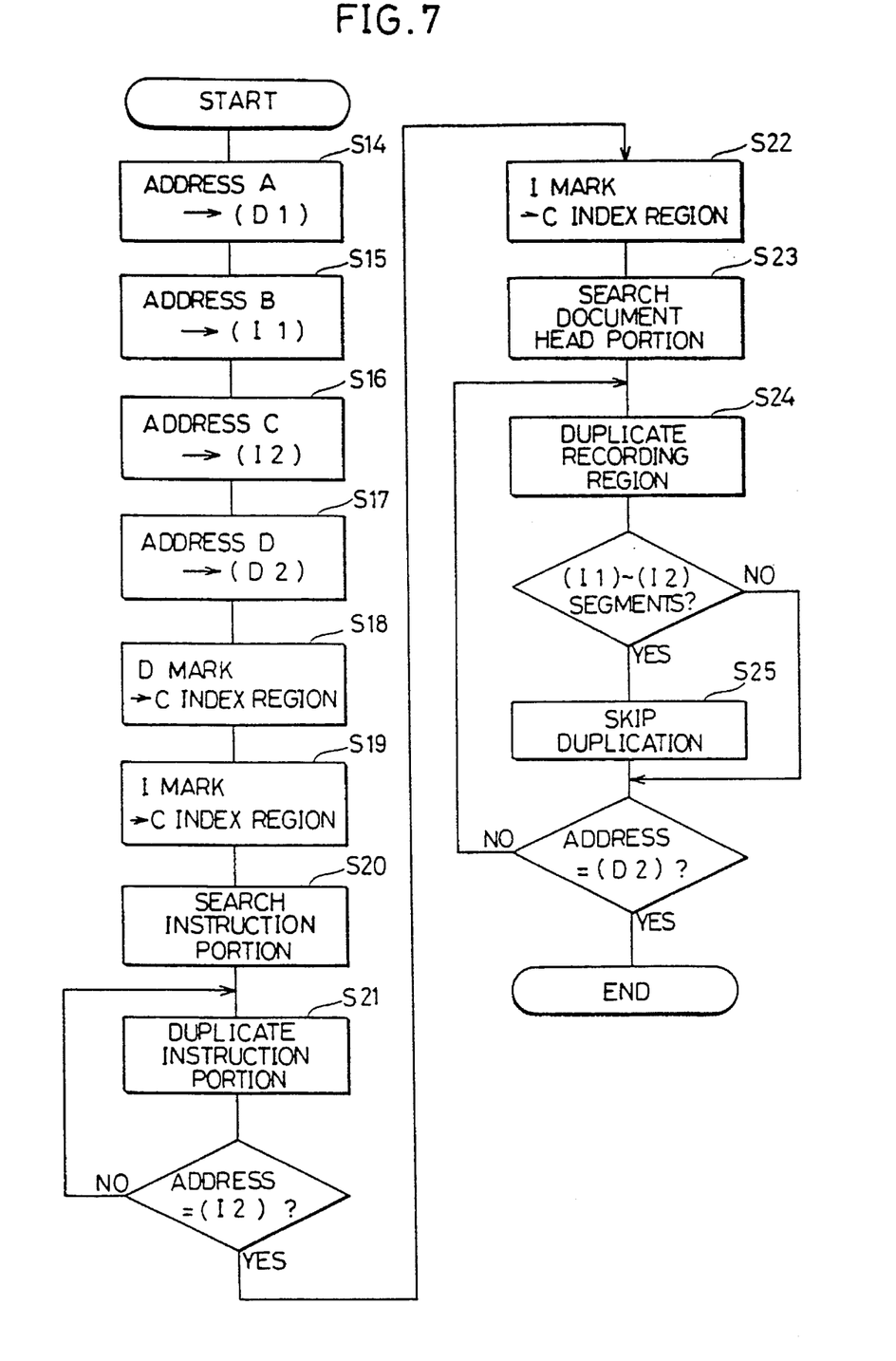
FIG. 7 is a flow chart showing an operation when the content of a memory card is duplicated in a built-in memory in an audio sound recording/reproducing apparatus.

An operation when a duplication is conducted from the memory card 6 into the built-in memory 14 in the master machine 33 at that time will be described in conjunction with FIGS. 7 and 8.

Figure 8:
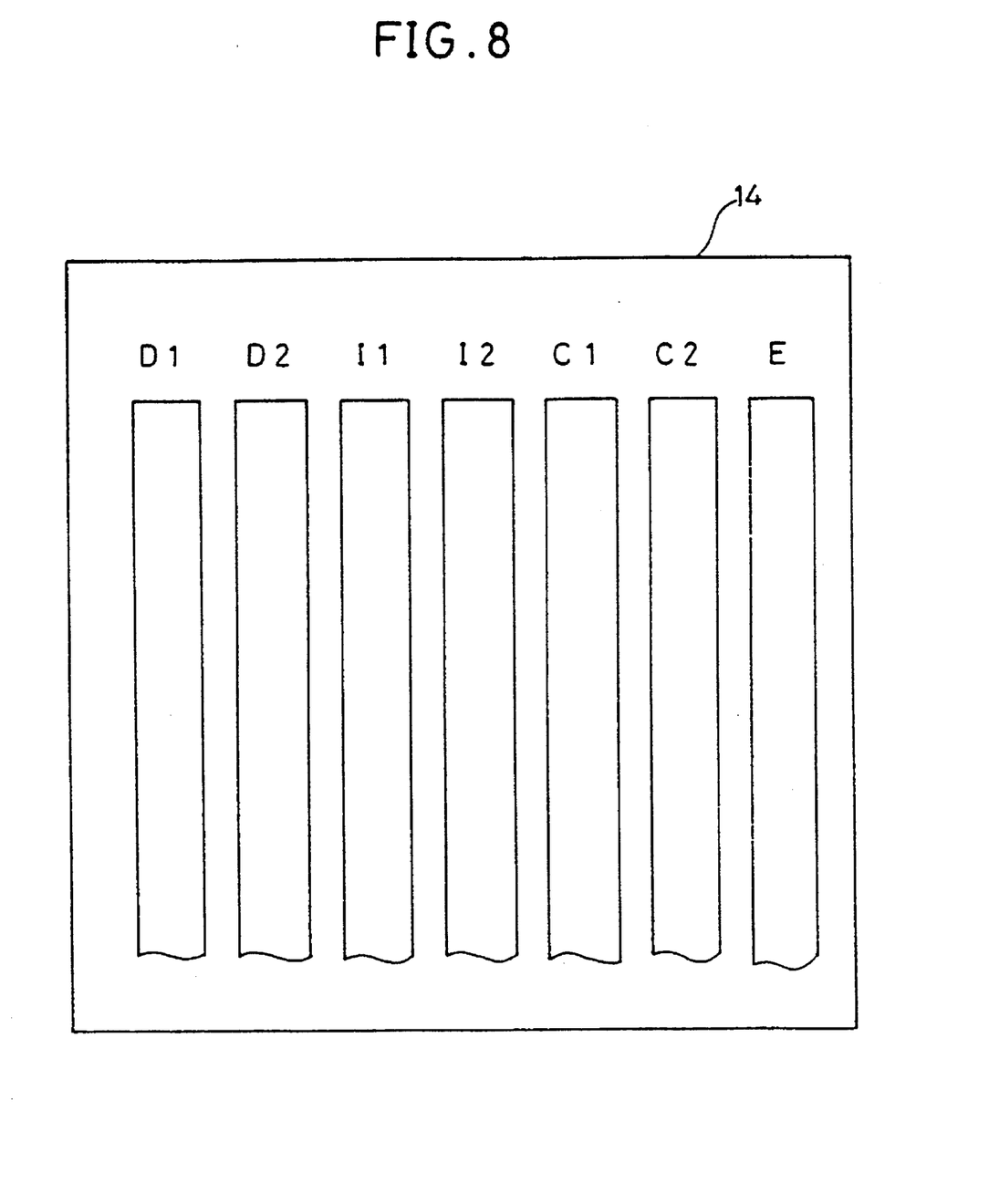
FIG. 8 is a representation schematically showing a construction a built-in memory.

FIG. 8 is a representation schematically showing the construction of the built-in memory 14.

For example, when the document portion 24 in the memory card 6 is stored, the A address of D mark to be an address representing the head of the document portion 24 is read out from the index region 27 of the memory card 6, and stored in the storage region D1 in the built-in memory 14 (S14). Similarly, the address B, the address C, and the address D are stored in the storage regions I1, I2, and D2, respectively in the built-in memory 14. (S15–S17).

Then, the flag 31 of D mark in the index region 27 is stored in the index region of the built-in memory 14 (region for storing source side address hereinafter referred to as C1 index region) (S18), and similarly the flag 28 of I mark is stored in the C index region (S19).

Subsequently, the instruction portion 25 in the recording region 26 is searched (S20), and the content of the instruction portion 25 is stored in the data storage region E of the built-in memory 14 (S21). After storing of the instruction portion 25 is completed, the flag 29 of I mark is stored in the C2 index region (region for storing address where data is copied) (S22), and the start of the document portion 24 in the recording region 26 is searched (S23).

Subsequently, the document portion 24 in the recording region 26 is stored from the beginning in the data storage region E of the built-in memory 14 (S24). At that time, the instruction portion 25 is skipped over and not duplicated (S25).

Figure 9:
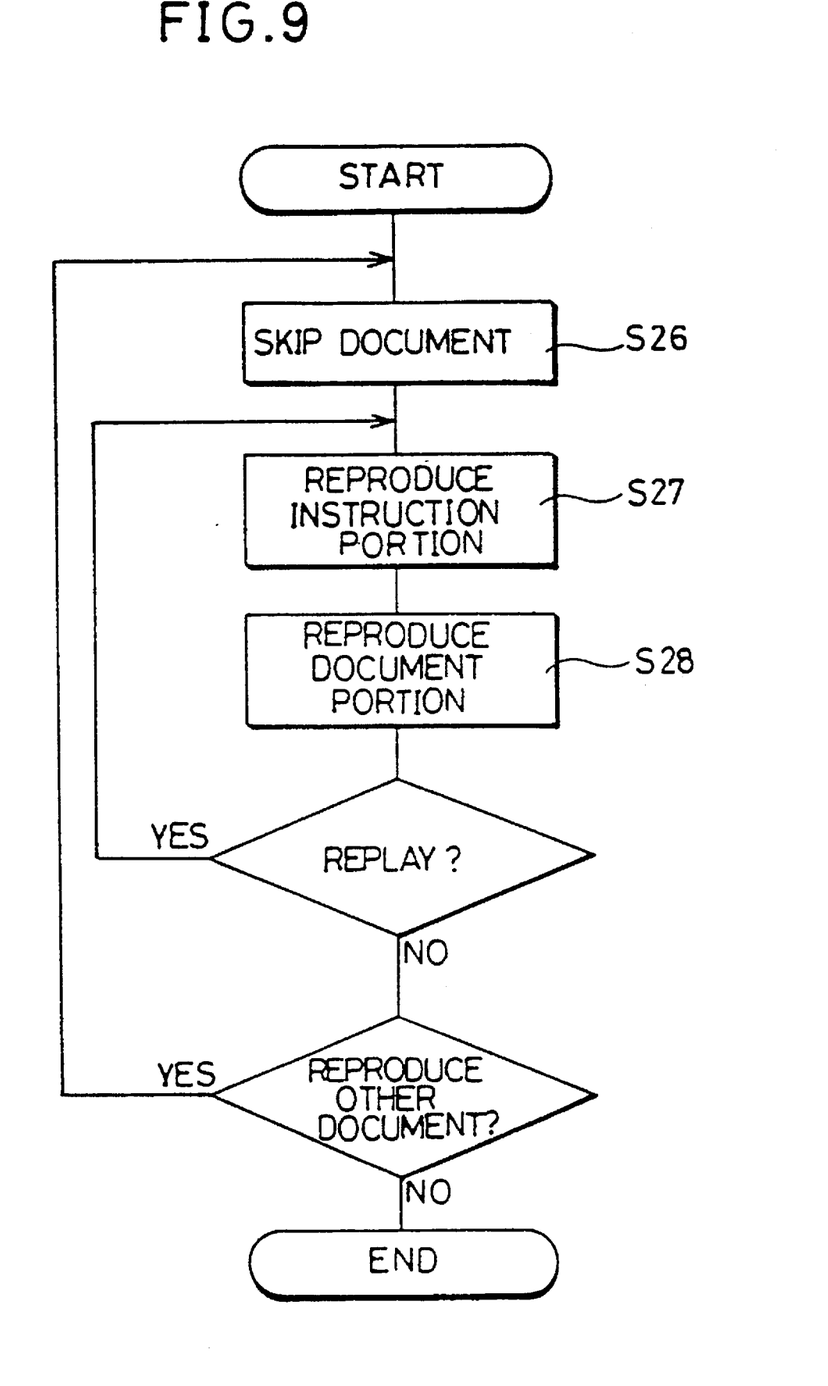
FIG. 9 is a flow chart showing an operation when an audio sound data duplicated in a built-memory in an audio sound recording/reproducing apparatus is reproduced.

When the document of the memory card 6 stored in the built-in memory 14 is reproduced, as shown in FIG. 9, until the document to be reproduced is selected documents stored before that are skipped over (S26). More specifically, the selection is effected by skipping the address and the mark stored in S19.

When the desired document is selected, the instruction portion is reproduced first (S27), and then the document portion is reproduced from the beginning (S28). At that time, in the recording region 26 of the memory card 6, since the instruction portion recorded in the middle of the document portion has been taken out and stored preceding the document portion when stored in the built-in memory 14, the document portion can be reproduced until the end without interruption by reproduction of the instruction portion.

Thus, skipping reproduction on a document by document basis allows an instruction related to a document to be reproduced prior to reproduction of the document when the desired document is reproduced.

By the above-stated construction, since sub information related to identification information for documents to be stored and instruction (in other words I mark or D mark) is recorded in the index region 27, skipping over or skipping back of reproduction can instantaneously be conducted referring to the sub information in the index region 27. Also at the time of reproduction, since the instruction portion can be reproduced as a priority segment prior to reproduction of a document referring to the sub information in the index region 27, a user can listen to the instruction before the document without any special operation such as retrieval of the instruction portion. Furthermore, when the content of the memory card 6 is stored in the built-in memory 14 of the apparatus, the instruction portion is stored before the document portion on a document by document basis, and a document is stored skipping over the instruction portion in the middle. Therefore, when a reproduction from the built-in memory 14 is conducted, the instruction is reproduced prior to the document, and the user can instantaneously determine the content of the document, thus preventing careless mistakes and misjudgments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An audio sound recording/reproducing apparatus utilizing a semiconductor memory, wherein said semiconductor memory includes a plurality of addressable locations forming a first digital storing region for storing document and information data including an instruction related to the document data inserted within said document data, and a plurality of addressable locations forming a second digital storing region for storing digital data corresponding to address locations of said document data and address locations of said instruction in said first storing region and digital identification data corresponding to the information data, wherein said digital data of said second storing region are stored during the time of the storing of the corresponding document and information data of said first storing region, said apparatus further including reference means for referring to the digital data in said second storing region for positioning data in said first storing region and controlling the recording/reproducing of document and information data in accordance with said digital data.

2. An audio sound recording/reproducing apparatus as recited in claim 1, further comprising, reproduction means for reproducing the document data of said first storing region by referring to the digital data of said second region using said reference means when said document data is reproduced.

3. An audio sound recording/reproducing apparatus as recited in claim 2, wherein said semiconductor memory comprises a memory card detachably mounted to said audio sound recording/reproducing apparatus.

4. An audio sound recording/reproducing apparatus as recited in claim 3, wherein said memory card includes a batch erase type programmable ROM.

5. An audio sound recording/reproducing apparatus as recited in claim 3, wherein audio sound-compressed data is written on said memory card.

6. An audio sound recording/reproducing apparatus as recited in claim 2, wherein said reproduction means reproduces only said document information among the information recorded in said first storing region excluding said instruction data at said time of reproduction.

7. An audio sound recording/reproducing apparatus as recited in claim 2, wherein a plurality of sets of document and information data are stored in said first storing region and a plurality of digital data corresponding respectively to each of said sets are stored in said second storing region, the apparatus, further comprising, specifying means responsive to digital data recorded in said second storing region for specifying desired priority document information among said plurality of sets of document and information data, and reproduction means for reproducing only said specified priority document information which is specified by said digital data.

8. An audio sound recording/reproducing system including a master machine and a slave machine, wherein a memory card is detachably mountable to said master machine and slave machine, said memory card including, a plurality of sequentially addressable memory locations forming a first storing region having a start address for storing information including a document and an instruction related to said document wherein said instruction is positioned at addressable locations within the document and a second storing region comprising another plurality of sequentially addressable memory locations, for storing the positions of said document and the addressable locations of the instruction within the document in said first storing region and identification data for said information in said first storing region and said master machine including storage means for storing the contents of said memory card, and control means for controlling the operation of said storage means such that the instruction information which was stored in first sequentially addressable locations of said first storing region of the memory card with respect to said document is stored in said storage means at second addressable locations with respect to said document in the first storing region.

9. An audio sound recording/reproducing system as recited in claim 8, wherein said storage means has first and second storage regions corresponding to said first and second storing regions of said memory card, and said control means controls said storage means such that the position and identification data of said second storing region of said memory card is stored in said second storage region of said storage means and said instruction information and document information are stored in accordance with the data stored in said second storage region of said storage means.

10. An audio sound recording/reproducing apparatus for recording and reproducing document data having inserted instructions comprising, a semiconductor memory including,
a first digital storing region for storing digitized document data containing inserted instruction data,
a second digital storing region for storing
i) addresses of said digitized document data,
ii) addresses of said inserted instruction data, and
iii) identification data related to said instruction data, and a processing device for reproducing in a reproducing mode by reference to said second digital storing region data from said first digital storing region in accordance with first, said identification data, second, said addresses of inserted instruction data, and third, said addresses of digitized document data.

11. Apparatus as in claim 10, wherein said processing device for reproducing in reproducing said digitized document data from said first digital storing region skips over any inserted instructions.

* * * * *